United States Patent
Yamagishi

[11] Patent Number: 6,147,949
[45] Date of Patent: Nov. 14, 2000

[54] RECORDING APPARATUS AND RECORDING METHOD

[75] Inventor: Yoshinobu Yamagishi, Tokyo, Japan

[73] Assignee: Sony Corporation, Tokyo, Japan

[21] Appl. No.: 09/114,794

[22] Filed: Jul. 13, 1998

[30]     Foreign Application Priority Data

Jul. 15, 1997  [JP]  Japan ................................. 9-189652

[51] Int. Cl.⁷ .................................................. G11B 7/00
[52] U.S. Cl. ................................. 369/83; 369/58; 369/47
[58] Field of Search ................................ 369/42, 48, 49, 369/50, 54, 58, 59, 83

[56]            References Cited

U.S. PATENT DOCUMENTS 5,825,739  10/1998  Saito et al. ................................. 369/83
5,889,747   3/1999  Hisamatsu et al. ..................... 369/58 X
6,088,304   7/2000  Aramaki et al. ....................... 369/48 X

FOREIGN PATENT DOCUMENTS

0600511 A2   6/1994  European Pat. Off. .
2219886 A   12/1989  United Kingdom .

*Primary Examiner*—Muhammad Edun
*Attorney, Agent, or Firm*—Limbach & Limbach L.L.P.; Seong-Kun Oh

[57]                ABSTRACT

The invention has an operating unit to such so that a latest recorded music piece certainly becomes a head music piece, a program is recorded into a data area of a magnetooptic disc in accordance with a depression of the operating unit, and a U-TOC is edited so that the music piece number of the program becomes a head. Thus, the newly recorded program can be set to the head music piece number. For example, when the user makes an original CD by collecting CD single music pieces, the latest music piece becomes the head music piece number and thus operability is improved.

27 Claims, 11 Drawing Sheets

| MUSIC PIECE NO. | MUSIC PIECE NAME |
|---|---|
| 1 | YESTERDAY |
| 2 | LOVE ME DO |
| 3 | HELP |
| | |

ORIGINAL MUSIC PIECE NO.

| MUSIC PIECE NO. | MUSIC PIECE NAME |
|---|---|
| 1 | YESTERDAY |
| 2 | LOVE ME DO |
| 3 | HELP |
| 4 | LET IT BE |
| | |

STANDARD RECORDING

Fig. 3A

| MUSIC PIECE NO. | MUSIC PIECE NAME |
|---|---|
| 1 | YESTERDAY |
| 2 | LOVE ME DO |
| 3 | HELP |
| | |

ORIGINAL PIECE NO.

Fig. 3B

| MUSIC PIECE NO. | MUSIC PIECE NAME |
|---|---|
| 1 | LET IT BE |
| 2 | YESTERDAY |
| 3 | LOVE ME DO |
| 4 | HELP |
| | |

TO-HEAD RECORDING

Fig. 8

| P-FRA ← ADR2 | P-TNO1 ← ADR1 | P-TNO2 ← ADR4 | P-TNO3 ← ADR3 |
|---|---|---|---|
| P-TNO4 ← ADR7 | | | |
| | | | |

| | | |
|---|---|---|
| ADR1 | Start address ← A1 | Track mode |
| | End address ← A2 | Link-P ← 00 |
| ADR2 | Start address ← A14 | Track mode |
| | End address ← A4 | Link-P ← ADR5 |
| ADR3 | Start address ← A5 | Track mode |
| | End address ← A6 | Link-P ← 00 |
| ADR4 | Start address ← A7 | Track mode |
| | End address ← A8 | Link-P ← ADR6 |
| ADR5 | Start address ← A9 | Track mode |
| | End address ← A10 | Link-P ← 00 |
| ADR6 | Start address ← A11 | Track mode |
| | End address ← A12 | Link-P ← 00 |
| ADR7 | Start address ← A3 | Track mode |
| | End address ← A13 | Link-P ← 00 |

Fig. 9

| | | | | |
|---|---|---|---|---|
| P-FRA ← ADR2 | P-TNO1 ← ADR7 | P-TNO2 ← ADR1 | P-TNO3 ← ADR4 | |
| P-TNO4 ← ADR3 | | | | |
| | | | | |

| | | |
|---|---|---|
| ADR1 | Start address ← A1 | Track mode |
| | End address ← A2 | Link-P ← 00 |
| ADR2 | Start address ← A14 | Track mode |
| | End address ← A4 | Link-P ← ADR5 |
| ADR3 | Start address ← A5 | Track mode |
| | End address ← A6 | Link-P ← 00 |
| ADR4 | Start address ← A7 | Track mode |
| | End address ← A8 | Link-P ← ADR6 |
| ADR5 | Start address ← A9 | Track mode |
| | End address ← A10 | Link-P ← 00 |
| ADR6 | Start address ← A11 | Track mode |
| | End address ← A12 | Link-P ← 00 |
| ADR7 | Start address ← A3 | Track mode |
| | End address ← A13 | Link-P ← 00 |

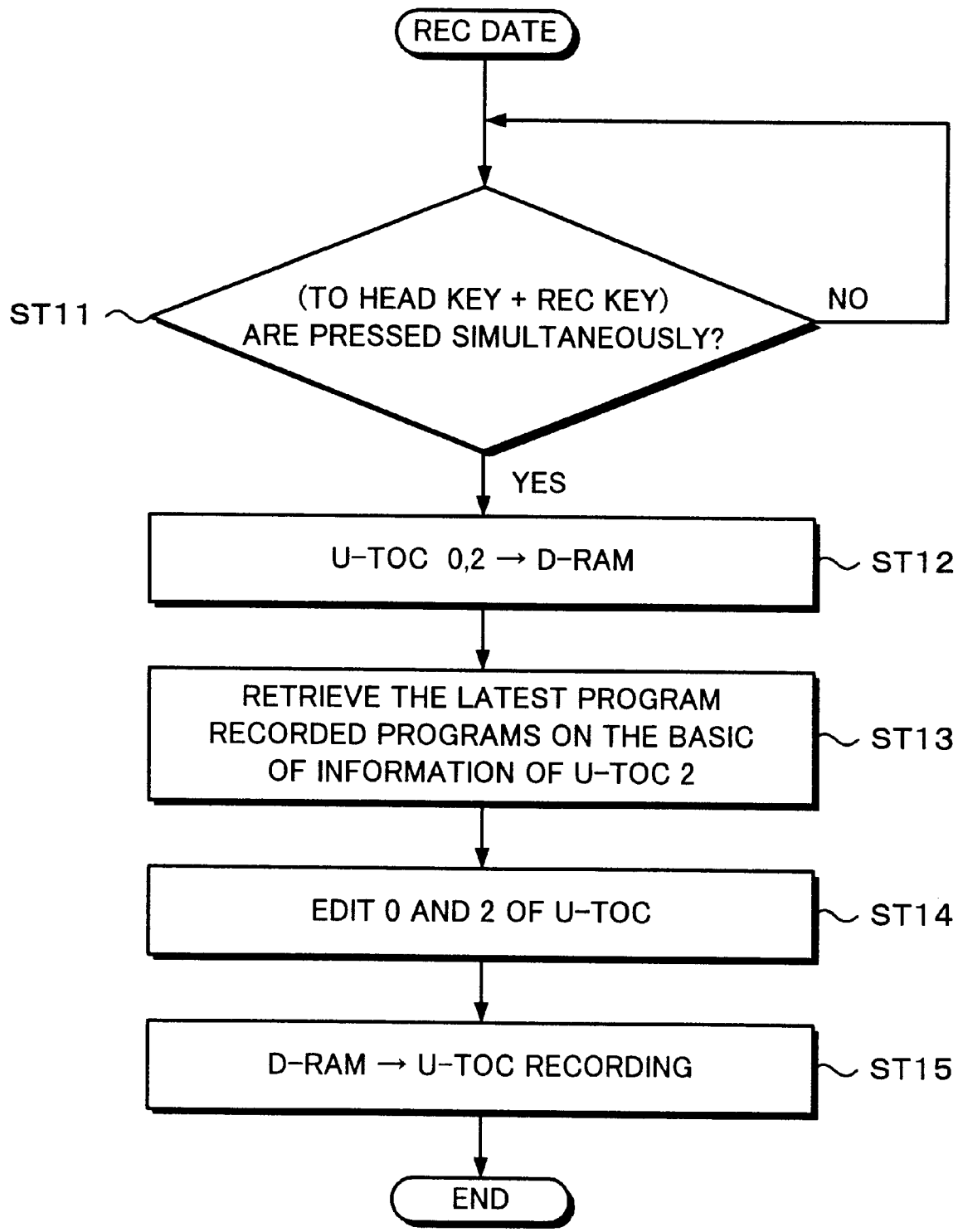

RECORDING APPARATUS AND RECORDING METHOD

BACKGROUND OF THE INVENTION

1. Field of the Invention

The invention relates to a recording apparatus and a recording method which are suitable for use in recording digital audio signal to an optical disc.

2. Description of the Related Art

A magnetooptic disc recording/reproducing apparatus for compressing and recording/reproducing digital audio signal to a small optical disc or magnetooptic disc enclosed in a cartridge is widely used.

In the magnetooptic disc recording/reproducing apparatus, since a small disc having a diameter of 64 mm is used and the recording and reproduction can be easily performed, in many cases, the user records his or her favorite favorite music onto the disc, loads the disc into a portable magnetooptic disc reproducing apparatus and enjoys music reproduction at an outdoor location, or loads the disc into a magnetooptic disc reproducing apparatus mounted in a vehicle and enjoys music reproduction in the car.

On the other hand, in many cases, the user records programs reproduced from an optical disc such as a compact disc onto a magnetooptic disc, or records programs transmitted via an FM broadcasting or a satellite broadcasting onto the magnetooptic disc, thereby forming an original magnetooptic disc and enjoying music reproduction.

A managing region of user data called U-TOC is provided in the magnetooptic disc in order to manage the programs recorded by the user. A start address, an end address, and the like for each of the programs recorded on the disc are recorded in correspondence to the program number of each program. When the magnetooptic disc is reproduced, the U-TOC is referred to and each program is accessed.

The program numbers when the programs are recorded to the magnetooptic disc are set in accordance with the time order of the recorded programs. For example, in the case of newly recording a next program "LET IT BE" to a disc on which "YESTERDAY", "LOVE ME DO", and "HELP" have already been recorded in the program numbers "1", "2", and "3", according to the conventional magnetooptic disc recording/reproducing apparatus, "LET IT BE" is recorded to the next program number "4".

As mentioned above, in the conventional magnetooptic disc recording/reproducing apparatus, when the user records programs to the disc, the program numbers of the programs are set in accordance with the recording order. However, when the user makes an original magnetooptic disc by collecting programs of his favorite artist or makes an original magnetooptic disc by collecting the latest hit programs, it is not always preferable to set the program numbers of the programs in accordance with the recording order.

That is, for example, it is now assumed that each time a single CD of a certain artist is released, programs are recorded to the magnetooptic disc and an original magnetooptic disc of the user is made by collecting single programs of this artist. In this case, in the conventional magnetooptic disc, the latest recorded program of the artist is recorded as the last number of the program number.

At the same time, if the user wants to listen to the latest programs, he or she must choose the programs by searching program numbers from the top. Therefore, it is difficult to reproduce the music quickly. Therefore, when the formed magnetooptic disc is reproduced as is, the reproduction is always started from the oldest recorded program. In this case, in spite of a fact that, in many cases, the program which the user wants to listen most is the latest hit program most recently recorded, the program number of the latest hit program is the last number. Therefore, since in the normal reproduction, an AMS (Auto Music Search) key is operated until the last programs are chosen, it is inconvenient.

For instance, in case of recording the favorite program of the user from the programs broadcasted by the FM broadcasting or satellite broadcasting, when the recording is finished, the program is often reproduced to confirm a recording state. However, in the conventional magnetooptic disc recording/reproducing apparatus, the program number of the program recorded most recently becomes the last. If it is reproduced as it is, the reproduction is started from the program recorded at the most preceding time and the program recorded just prior thereto cannot be easily reproduced.

As for the magnetooptic disc, since an accessing speed is high and it is possible to easily access to the head of a desired program generally, if the program number of the program recorded just before is designated and reproduced, the program recorded just before can be easily reproduced. In the magnetooptic disc recording/reproducing apparatuses, there is an apparatus having a function to edit the program numbers on the disc. By using this function, the program recorded just before can be set to the head program number.

That is, by performing the following operations, in the conventional magnetooptic disc recording/reproducing apparatus, the newly recorded recorded can be set to the head program number.

(1) A magnetooptic disc is inserted into the magnetooptic disc recording/reproducing apparatus.
(2) The number of programs which have already been recorded and the program numbers are confirmed.
(3) A new program is recorded by pressing the recording key.
(4) Upon completion of the recording, since the program has been set to the last program number, the program number is changed by using the editing key.
(5) Recording and edition are completed.

However, the editing operation of the program numbers as mentioned above cannot be easily performed. Further, when the next program is recorded, similar operations have to be repeated.

It is, therefore, an object of the invention to provide a recording apparatus and a recording method which can easily set the program number of a newly recorded program to the head program number.

SUMMARY OF THE INVENTION

It is an object of the invention that a key called a "To Head" key is provided, and the recording can be performed in a manner such that a music piece number of a program recorded just before becomes a head in accordance with an operation of the "To Head" key.

That is, by executing the following operations, the program which is newly recorded is shifted to the head music piece number.

(1) A magnetooptic disc is inserted into a magnetooptic disc recording and reproducing apparatus.
(2) A new program is recorded by pressing the "To Head" key.
(3) After completion of the recording, a managing area is edited in a manner such that the new program is shifted to the head music piece number.
(4) The recording edition is completed.

Another object of the invention is that by simultaneously pressing the "To Head" key and a recording key, the order of the music pieces of the programs can be edited in a manner such that the music piece number of the program which was recorded most recently becomes the head.

According to the invention, the above objects are accomplished by a recording apparatus for recording programs into a recording medium having a program area in which a plurality of programs are recorded and a managing area in which management data to manage the programs recorded in the program area has been recorded, comprising:

recording means for overwriting a new program onto the programs which have already been recorded; and editing means for editing the management data in the managing area in a manner such that the overwritten new program becomes a head program.

The above, and other, objects, features and advantage of the present invention will become readily apparent from the following detailed description thereof which is to be read in connection with the accompanying drawings.

BRIEF DESCRIPTION OF THE DRAWINGS

FIG. 3A is a table showing the titles of music pieces which have previously been recorded on the magnetooptic disc.

FIG. 3B is a table showing a re-arrangement of the order of music pieces according to the invention in the case where a new music piece is overwritten onto music pieces which have previously been recorded on a magnetooptic disc.

FIG. 8 is a data structural diagram showing an editing result of a managing area U-TOC sector-0 of a conventional magnetooptic disc.

FIG. 9 is a data structural diagram showing an edition result of a managing area U-TOC sector-0 of a magnetooptic disc of the invention;

FIG. 12 is a flowchart for use in explanation of the operation in an example of the magnetooptic disc recording and reproducing apparatus to which the invention can be applied.

DESCRIPTION OF THE PREFERRED EMBODIMENTS

Figures 1, 2A, 2B:
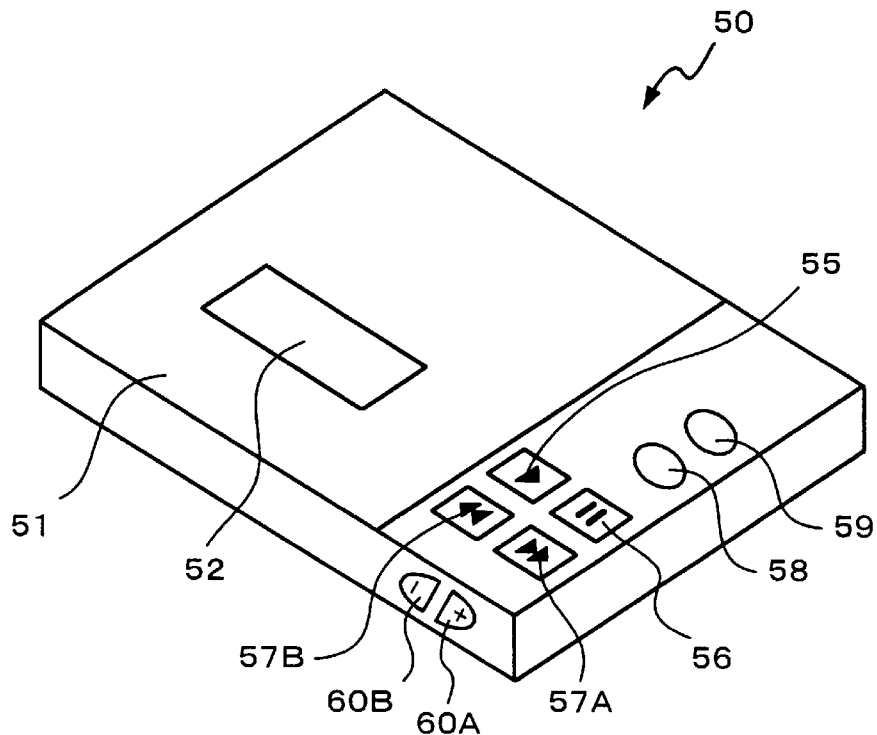
FIG. 1 is a perspective view of an example of a magnetooptic disc recording and reproducing apparatus to which the invention can be applied.
FIG. 2A is a table showing titles of music pieces which have previously been recorded on a magnetooptic disc.
FIG. 2B is a table showing a conventional re-arrangement of the order of music pieces in the case where a new music piece is overwritten onto music pieces which have previously been recorded on a magnetooptic disc.

An embodiment of the invention will now be described hereinbelow with reference to the drawings. FIG. 1 shows an entire magnetooptic disc recording/reproducing apparatus 50 to which the invention is applied. In FIG. 1, a disc loading portion 51 is provided for the magnetooptic disc recording/reproducing apparatus 50. The disc loading portion 51 is closable. When a disc is loaded or ejected, the disc loading portion 51 is opened and the disc is loaded and ejected into/from the disc loading portion 51.

A display portion 52 is provided on the disc loading portion 51. The display portion 52 is, for example, a liquid crystal display. A recording time, a reproducing time, a track number, and the like are displayed in the display portion 52. Information of the disc and information regarding each program recorded on the disc can be also displayed on the display portion 52 by characters.

A play key 55, a stop key 56, FF (fast forward) key and REW (rewind) key 57A and 57B, and a recording key 58 are provided on the upper surface of the magnetooptic disc recording/reproducing apparatus 50. Further, a "To Head" key 59 is provided for the magnetooptic disc recording/reproducing apparatus to which the invention is applied. The "To Head" key 59 is used when recording so that the music piece number of the music piece newly recorded becomes the head.

Volume up and down keys 60A and 60B are provided on the side surface of the magnetooptic disc recording/reproducing apparatus 50. Although not shown, an input terminal to input an audio signal from the outside, an output terminal to output an audio signal to the outside, and a headphones output terminal are provided on the side surface of the magnetooptic disc recording/reproducing apparatus 50.

As mentioned above, the "To Head" key 59 is provided for the Magnetooptic disc recording/reproducing apparatus 50 to which the invention is applied. By using the "To Head" key 59, the recording can be performed so that the music piece number of the newly recorded music piece becomes the head.

For example, as shown in FIG. 2A, it is assumed that the next music piece "LET IT BE" is newly recorded on the disc on which "YESTERDAY", "LOVE ME DO", and "HELP" have already been recorded in the music piece numbers "1", "2", and "3".

In this case, when the ordinary recording is performed by pressing the recording key 58, as shown in FIG. 2B, the music piece numbers "1", "2", and "3" are not changed, "YESTERDAY", "LOVE ME DO", and "HELP" are recorded, and "LET IT BE" is recorded in the next music piece number "4".

On the other hand, when the next music piece "LET IT BE" is recorded by pressing the "To Head" key 59, as shown in FIG. 3B, the music piece number "1" is set to the newly recorded music piece "LET IT BE", the music piece number "2" is set to "YESTERDAY", the music piece number "3"

is set to "LOVE ME DO", and the music piece number "4" is set to "HELP". As mentioned above, when the recording is performed by pressing the "To Head" key 59, the newly recorded music piece is set to the head music piece number.

The recording by the "To Head" key 59 is effective in the case of making an original Magnetooptic disc.

For example, it is now assumed that each time a single CD of a certain artist is released, music pieces are recorded onto an magnetooptic disc, thereby making an original magnetooptic disc of the user by collecting the single music pieces of the artist. In this case, the music piece which the user wants to listen most is often a latest hit music piece. When the recording is performed by pressing the "To Head" key 59, since the music piece number of the newly recorded music piece becomes the head, the latest hit music piece is set to the head music piece number and it is possible to easily access to the newest music piece.

For example, in the case of recording a favorite music piece of the user to the magnetooptic disc from the music pieces which are broadcasted by the FM broadcasting or satellite broadcasting, in many cases, when the recording is finished, the music piece is reproduced and a recording state is confirmed.

When the recording is performed by pressing the "To Head" key 59, since the music piece number of the music piece recorded just before becomes the head, the recorded music piece can be easily confirmed.

Further, the magnetooptic disc is suitable for leaving a recording of a conference or learning a language by recording his own voice. Even in the case of leaving the record of the conference or learning a language as mentioned above, the "To Head" key 59 is effective. That is, when the recording is performed by pressing the "To Head" key 59, it is possible to easily access the recorded portion and a statement recorded just before or his own pronunciation can be soon confirmed.

In the example of FIG. 1, although the portable type magnetooptic disc recording/reproducing apparatus has been shown, an apparatus for which the "To Head" key can be provided is not limited to the construction of the portable type. The "To Head" key can be also provided for magnetooptic disc recording/reproducing apparatus built in an audio component stereophonic system. In this case, it is also possible to construct in a manner such that the "To Head" key and the reproducing operation of a CD reproducing apparatus are interlocked and when the "To Head" key is pressed, the reproduction of the CD is automatically started.

Figure 4:
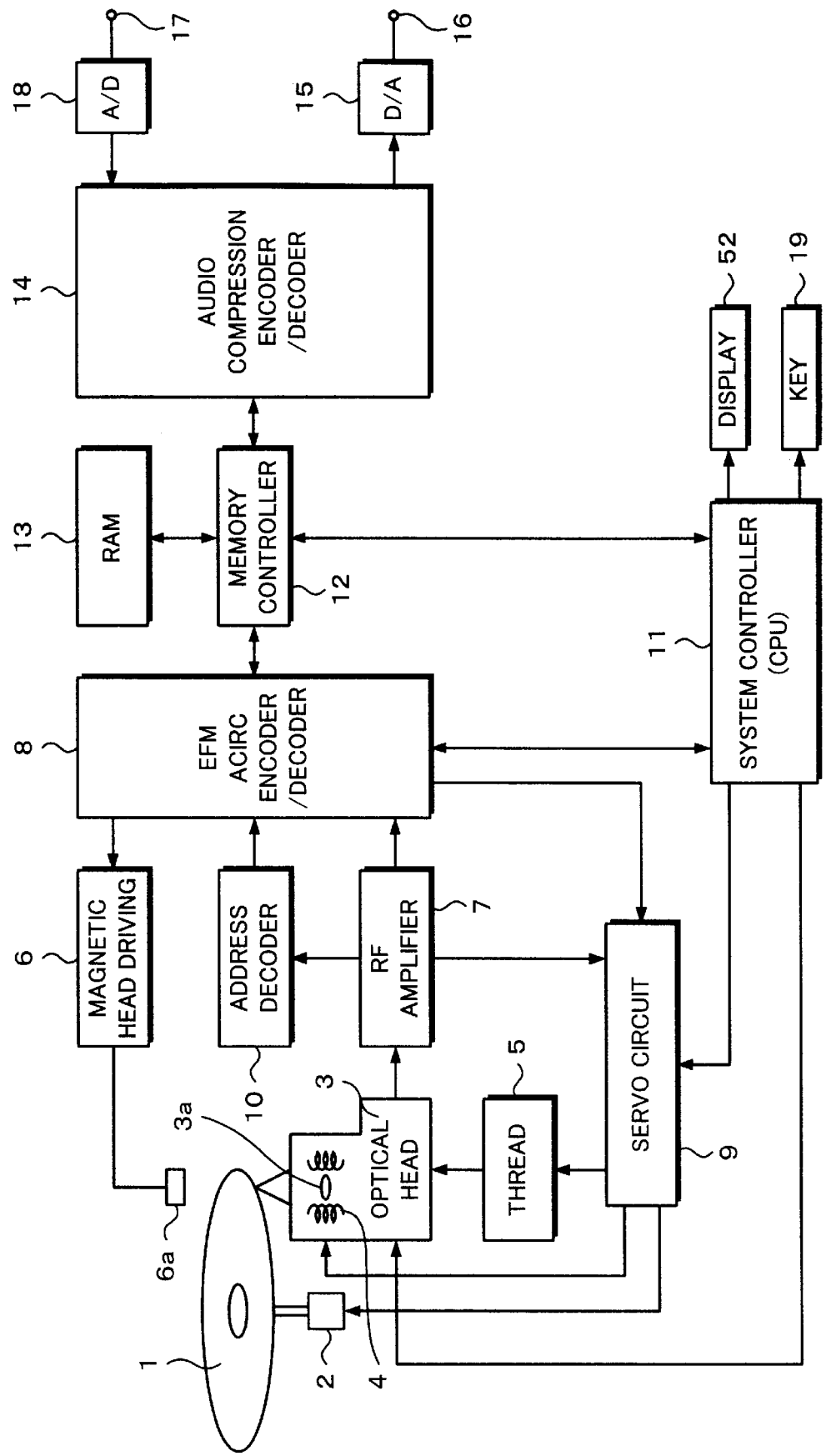
FIG. 4 is a block diagram of an example of a magnetooptic disc recording and reproducing apparatus to which the invention can be applied.

FIG. 4 is a block diagram showing a construction of an magnetooptic disc recording/reproducing apparatus to which the invention can be applied. In FIG. 4, reference numeral 1 denotes a magnetooptic disc. The magnetooptic disc 1 is rotated by a spindle motor 2. The magnetooptic disc 1 is a disc having a diameter of 64 mm enclosed in a cartridge and is called Magnetooptic disc (Mini Disc trade mark). In place of the magnetooptic disc 1, a read only optical disc can be loaded.

An optical head 3 is provided for the magnetooptic disc 1. The optical head 3 generates a laser beam at a high level to heat a recording track to a Curie temperature upon recording and generates a laser at a relatively low level to detect data from the reflection light due to a magnetic Kerr effect upon reproduction.

The optical head 3 has a laser diode to emit the laser beam, an optical system comprising a polarization beam splitter and an objective lens, and a detector to detect the reflection light. An objective lens 3a is held by a biaxial device 4 so that it can be displaced in the radial direction of the disc and the direction in which it approaches or moves away from the disc.

A magnetic head 6a is provided so as to face the optical head 3.

The magnetic head 6a applies a magnetic field modulated by the data onto the magnetooptic disc 1. The whole optical head 3 and magnetic head 6a are movable in the radial direction of the disc by a thread mechanism 5.

Information detected from the magnetooptic disc 1 by the optical head 3 is supplied to an RF amplifier 7. From the RF amplifier 7, by arithmetically processing an output of each detector of the optical head 3, a reproduction RF signal, a tracking error signal, a focusing error signal, absolute position information which has been wobble recorded, and address information, and the like are extracted. The reproduction RF signal is supplied to an EFM (Eight To Fourteen Modulation) and ACIRC (Advanced Cross Interleave Reed-Solomon Code) encoder/decoder unit 8. The tracking error signal from the RF amplifier 7 is supplied to a servo circuit 9. The address information is supplied to an address decoder 10 and is decoded and is outputted as an absolute position address.

The servo circuit 9 generates the tracking error signal, focusing error signal, a track jump instruction and a seek instruction from a system controller 11, and various servo driving signals based on rotational speed detection information or the like of the spindle motor 2, controls the biaxial device 4 and thread mechanism 5, and performs focusing and tracking controls.

The whole operation is managed by the system controller 11. An input from an operation input unit 19 is supplied to the system controller 11. The operation input unit 19 includes the play key 55, stop key 56, FF key and REW key 57A and 57B, recording key 58, "To Head" key 59, volume up and down keys 60A and 60B, and the like.

An output of the system controller 11 is supplied to the display portion 52. Various setting states are displayed on the display portion 52.

Upon recording, an analog audio signal is supplied to an input terminal 17. The analog audio signal is supplied to an A/D converter 18. The analog audio signal is digitized by the A/D converter 18 by, for example, a sampling frequency of 44.1 kHz and the number of quantization bits of 16 bits. An output of the A/D converter 18 is supplied to an audio compression encoder/decoder 14. The audio compression encoder/decoder 14 compresses audio data by an ATRAC (Advanced Transform Acoustic Coding). The audio data is compressed into about ⅕ by the audio compression encoder/decoder 14.

An output of the audio compression encoder/decoder 14 is once stored in an RAM 13 under the control of a memory controller 12. An output of the RAM 13 is supplied to the EFM and ACIRC encoder/decoder 8. An error correction encoding by the ACIRC is performed by the EFM and ACIRC encoder/decoder 8 and further, the recording data is EFM modulated. An output of the EFM and ACIRC encoder/decoder 8 is supplied to the magnetic head 6a through a magnetic head driving circuit 6.

The magnetic head driving circuit 6 supplies a magnetic head driving signal to the magnetic head 6a in accordance with the encoding processed recording data. That is, a magnetic field by the magnetic head 6a is applied to the magnetooptic disc 1. In this instance, the laser beam at the recording level is outputted from the optical head 3. Thus, the data is recorded onto the magnetooptic disc 1 by the magnetic modulation system.

Upon reproduction, the recording signal of the magnetooptic disc 1 is reproduced by the optical head 3. An output of the optical head 3 is supplied to the RF amplifier 7. A reproduction RF signal is derived from the RF amplifier 7. The reproduction RF signal is supplied to the EFM and ACIRC encoder/decoder 8. In the EFM and ACIRC encoder/decoder 8, an EFM demodulating process and an error correcting process by the ACIRC are executed to the reproduction RF signal.

An output of the EFM and ACIRC encoder/decoder 8 is once written in the RAM 13 under the control of the memory controller 12. The data reading operation from the magnetooptic disc 1 by the optical head 3 and the transfer of the reproduction data in the system from the optical head 3 to the RAM 13 are intermittently executed at 1.41 Mbits/sec.

The data written in the RAM 13 is read out at a timing of a reproduction data transfer rate of 0.3 Mbits/sec and is supplied to the audio compression encoder/decoder 14.

In the audio compression encoder/decoder 14, a decompressing process of the audio data by the ATRAC is performed.

An output of the audio compression encoder/decoder 14 is supplied to a D/A converter 15. The digital audio signal is converted to an analog audio signal by the D/A converter 15. The analog audio signal is outputted from an output terminal 16.

The writing/reading operations of the data to/from the RAM 13 are executed by designating an address by the control of a write pointer and a read pointer by the memory controller 12. However, the write pointer is increased at a timing of 1.41 Mbits/sec. The read pointer is increased at a timing of 0.3 Mbits/sec. By a difference of the writing and reading bit rates, the apparatus enters a state where the data of a certain amount has been accumulated in the RAM 13. When the data of a full capacity is accumulated in the RAM 13, the increasing operation of the write pointer is stopped and the reading operation of the data from the magnetooptic disc 1 by the optical head 3 is also stopped. Since the increasing operation of the read pointer is continuously executed, the reproduction audio output is not interrupted.

After that, when it is now assumed that only the reading operation from the RAM 13 is continued and the data accumulation amount in the RAM 13 is equal to or less than a predetermined amount at a certain time point, the data reading operation by the optical head 3 and the increasing operation of the write pointer are restarted and the data is again accumulated in the RAM 13.

By generating the reproduction audio signal through the RAM 13, for example, even in the case where the tracking is deviated due to a disturbance or the like, the reproduction audio output is not interrupted. For instance, by accessing to the correct tracking position while the data accumulation remains and by restarting the data reading operation, the operation can be continued without exerting an influence on the reproduction output.

A TOC (Table Of Contents) is provided for a lead-in area of the innermost rim of the magnetooptic disc 1. A U-TOC (User Table Of Contents) to manage user data is provided on the just outside of the lead-in area. Fundamental information and a start address and an end address of each music piece are recorded in a sector 0 of the U-TOC.

Figure 5:
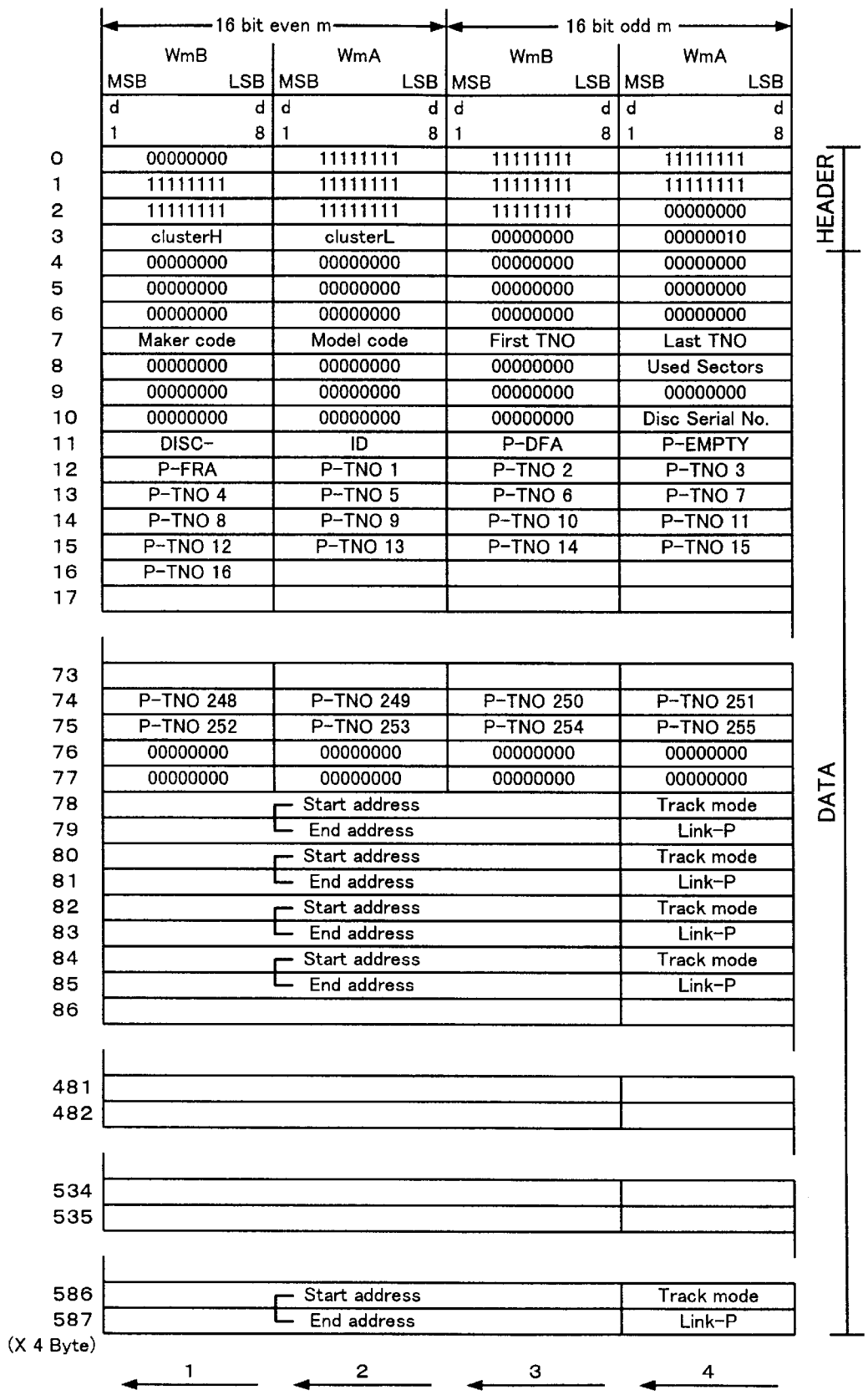
FIG. 5 is a data structural diagram of a managing area U-TOC sector-0 of a magnetooptic disc.

FIG. 5 shows a construction of the U-TOC sector 0. As shown in FIG. 5, a header of a predetermined bit pattern is provided at the head of the U-TOC sector 0. Subsequently, a maker code (Maker code), a model code (Model code), a music piece number of the first music piece (First TNO), a music piece number of the last music piece (LAST TNO), a sector using situation (Used Sectors), a disc serial number (Disc Serial No), a disc ID (Disc ID), and the like are recorded at predetermined address locations.

Further, various table pointers indicative of information such as region of the music pieces recorded by recording by the user, free area region, and the like are recorded. A start address serving as a start point of a corresponding parts, an end address serving as a termination, and its mode information (tracking mode) are recorded at positions shown by the table pointers. Further, since there is a case where the parts shown by each parts table are continuously coupled to the other parts, link information (Link-P) showing the position of the parts table in which the start address and end address of the parts which are coupled have been recorded is recorded.

A byte position of the pointer is obtained by $$76 \times 4 + (\text{pointer}) \times 8 \tag{1}$$

When there is a defective region on the disc, a table pointer P-DFA is a pointer showing the position of the head parts table in the defective region. That is, when defective parts exist, start and end addresses in the defect existing portion are shown in the parts table of the position shown by the table pointer P-DFA. When other defective parts exist, the position of the parts table is indicated by the link information (Link-P). When there is no other defective parts, the link information (Link-P) is set to, for example, (OOh) and it is regarded that there is no link after that.

A table pointer P-EMPTY is a pointer indicative of the position of the head parts table among the unused parts table. Start and end addresses of the portions of the unused regions are shown in the parts table designated by the table pointer P-EMPTY. Further, when a plurality of unused parts tables exist, the positions of the parts tables are sequentially designated by the link information (Link-P). When there is no other unused region, the link information (Link-P) is set to, for instance, (00h) and it is regarded that there is no link after that.

A table pointer P-FRA is a pointer showing the position of the head parts table in the writable free area (including an erasing region).

When there are a plurality of such parts, namely, there are a plurality of parts table, the parts tables are sequentially designated by the link information (Link-P). When there is no other free area, the link information (Link-P) is set to, for example, (00h) and it is regarded that there is no link after that.

Table pointers P-TNO1 to P-TNO255 are pointers showing the position of the head parts table with respect to each program recorded by the user. That is, the table pointer P-TNO1 indicates the position of the parts table in which the start and end addresses of the data of the first program of music piece have been recorded. The table pointer P-TNO2 indicates the position of the parts table in which the start and end addresses of the data of the second program of music piece have been recorded. The table pointer P-TNO3 indicates the position of the parts table in which the start and end addresses of the data of the third music piece have been recorded.

The data of one music piece can be also physically discontinuously recorded, namely, over a plurality of parts. When one music piece is divided into a plurality of parts and recorded, the positions of the parts table are sequentially indicated by the link information (Link-P). When the music pieces do not successively exist in the other parts table, the link information (Link-P) is set to, for example, (00h) and it is regarded that there is no link after that.

As mentioned above, the "To Head" key 59 is provided for the magnetooptic disc recording/reproducing apparatus to which the invention is applied. When the "To Head" key 59 is pressed, the music piece recorded just prior thereto is set to the head music piece number. Such a process can be realized by editing the sector 0 of the U-TOC mentioned above.

Figure 6:
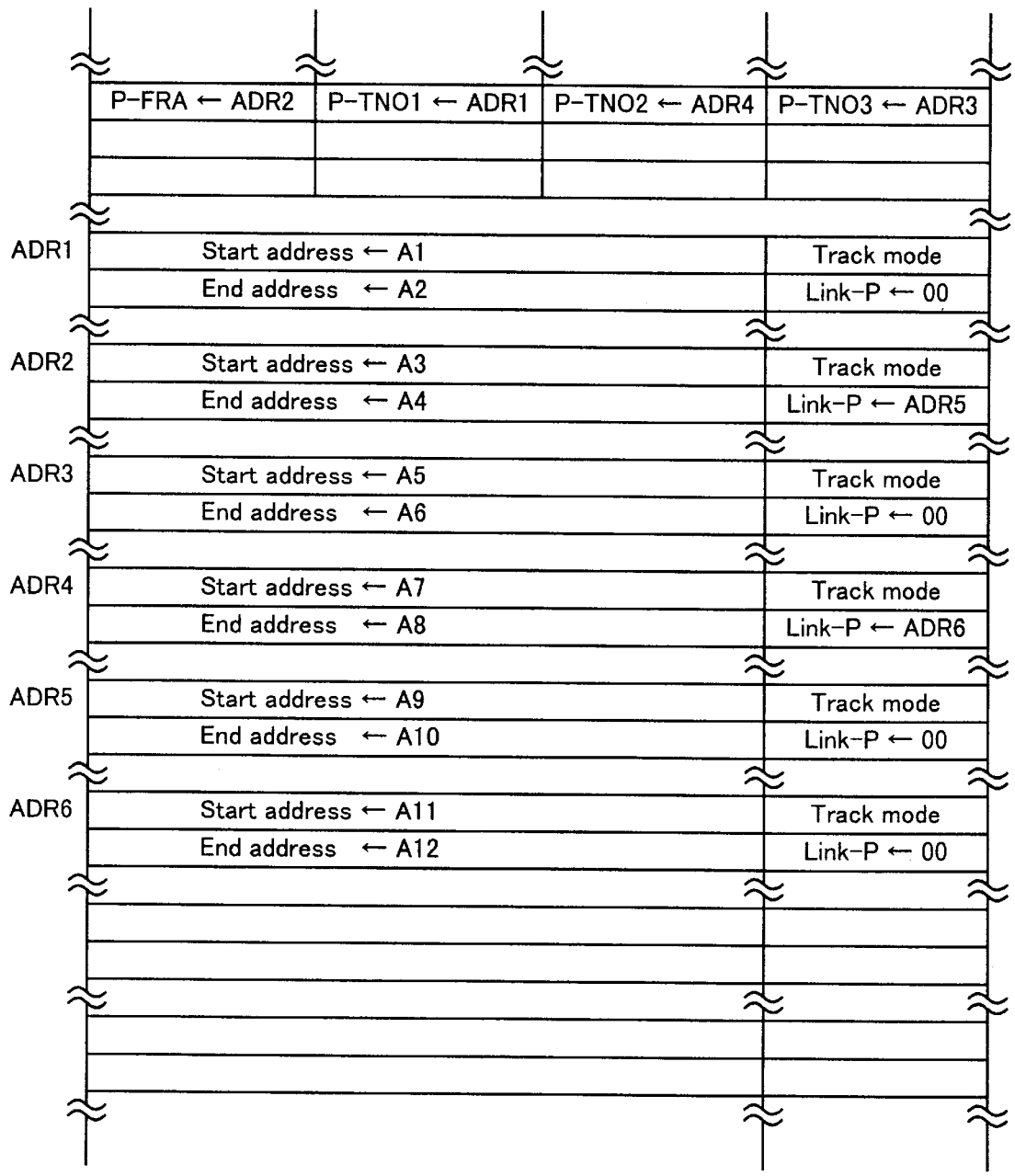
FIG. 6 is a data structural diagram before edition of the managing area U-TOC sector-0 of the magnetooptic disc.
Figure 7A:
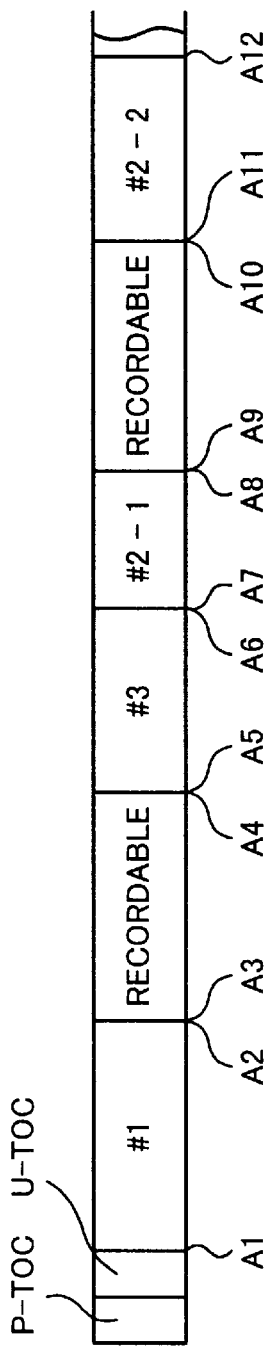
FIG. 7A is a schematic diagram showing a recording position on the magnetooptic disc of music pieces which have previously been recorded on the disc.

For example, it is now assumed that data as shown in FIG. 6 has been recorded in the table pointer of the sector 0 of the U-TOC. In this case, the data is arranged on the disc as shown in FIG. 7A.

That is, in FIG. 6, the table pointer P-TNO1 of the first program of music piece shows a position ADR1. A1 is written as a start address and A2 is written as an end address in the parts shown by the position ADR1. Therefore, as shown in FIG. 7A, the first program of music piece is recorded in the addresses Al to A2 on the disc.

As shown in FIG. 6, A7 is written as a start address and AB is written as an end address in the parts of a position ADR4 shown by the table pointer P-TNO2 of the second program of music piece. All is written as a start address and A12 is written as an end address in the parts of a position ADR6 shown by the link information Lin-P. Therefore, as shown in FIG. 7A, the former half of the second program of music piece is recorded in the addresses A7 to A8 on the disc and the latter half of the second program of music piece is recorded in the addresses A11 to A12.

As shown in FIG. 6, A5 is written as a start address and A6 is written as an end address in the parts of a position ADR3 shown by the table pointer P-TNO3 of the third program of music piece. The link information Link-P is set to (00h). Therefore, the third program of music piece is recorded in the addresses A5 to A6 on the disc as shown in FIG. 7A.

As shown in FIG. 6, A3 is written as a start address and A4 is written as an end address in the parts of the position ADR2 indicated by the table pointer P-FRA of the writable free area. A9 is written as a start address and A10 is written as an end address into the parts of the position ADR5 indicated by the link information Lin-P.

Therefore, as shown in FIG. 7A, the areas in the addresses A3 to A4 and the addresses A9 to A10 on the disc become recordable free areas.

Figure 7B:
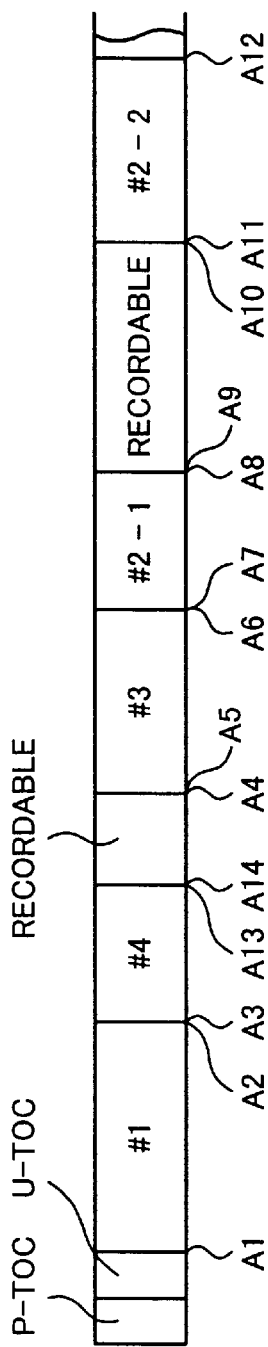
FIG. 7B is a schematic diagram showing a recording position on a magnetooptic disc in a conventional apparatus in the case where a new music piece is overwritten onto music pieces which have previously been recorded on the disc.

When the ordinary recording is performed by using the recording key 58 onto the disc on which the data has been recorded as shown in FIG. 7A, the data is recorded as shown in FIG. 7B and the U-TOC in this instance is as shown in FIG. 8.

That is, as shown in FIG. 7A, since the recordable free areas are the areas in the addresses A3 to A4 and addresses A9 to A10, the next data is recorded from the address A3.

If the data recorded next lies within the free area in the addresses A3 to A4, as shown in FIG. 7B, the next data is recorded in addresses A3 to A13 in the addresses 3 to A4 and becomes the fourth music piece. Addresses A14 to A4 become a new free area.

As shown in FIG. 8, therefore, the first, second, and third music pieces are not changed. A3 is written as a start address and A13 is written as an end address into the parts of the position ADR7 indicated by the table pointer P-TNO4 of the fourth music piece. (00h) is written in the link information Link-P.

A14 is written as a start address and A4 is written as an end address into the parts of the position ADR2 indicated by the table pointer P-FRA of the writable free area. A9 is written as a start address and A10 is written as an end address into the parts of the position ADR5 indicated by the link information Link-P.

The editing process of managing area of U-TOC, as mentioned above, is similar to the process of editing managing area recorded by conventional overwritten recording.

Figure 7C:
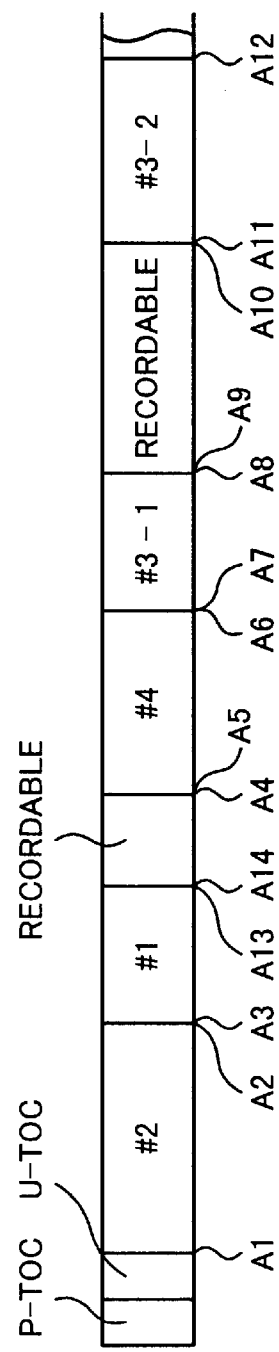
FIG. 7C is a schematic diagram showing a recording position on a magnetooptic disc in the case where the invention is applied when a new music piece is overwritten onto music pieces which have previously been recorded on the disc.

On the other hand, when the recording is performed by using the "To Head" key 59, the data is recorded as shown in FIG. 7C and the U-TOC in this instance is as shown in FIG. 9.

That is, as shown in FIG. 7A, since the recordable free areas are the areas in the addresses A3 to A4 and the addresses A9 to A10, the next data is recorded from the address A3.

If the data recorded next lies within the free area in the addresses A3 to A4, as shown in FIG. 7C, the next data is recorded in the addresses A3 to A13 in the addresses A3 to A4 and the addresses A14 to A4 become a new free area.

The music piece number of the newly recorded music piece is set to the first music piece. The music piece numbers of the music pieces corresponding to the first, second, and third music pieces are changed to the second, third, and fourth music pieces.

Therefore, as shown in FIG. 9, the start address A3 and end address A13 of the newly recorded region are recorded at the position ADR7 on the U-TOC. The table pointer P-TNO1 of the first music piece is updated from the position ADR1 so far to ADR7.

The table pointer P-TNO2 of the second music piece is updated from the position ADR4 so far to ADR1. The table pointer P-TNO3 of the third music piece is updated from the position ADR3 so far to ADR4.

The position ADR3 is written in the table pointer P-TNO4 of the fourth music piece. A14 is written as a start address and A4 is written as an end address into the parts of the position ADR2 indicated by the table pointer P-FRA of the writable free area. A9 is written as a start address and A10 is written as an end address into the parts of the position ADR5 indicated by the link information Link-P.

As mentioned above, by editing the sector 0 of the U-TOC, the music piece number of the newly recorded music piece can be set to the head.

Figure 10:
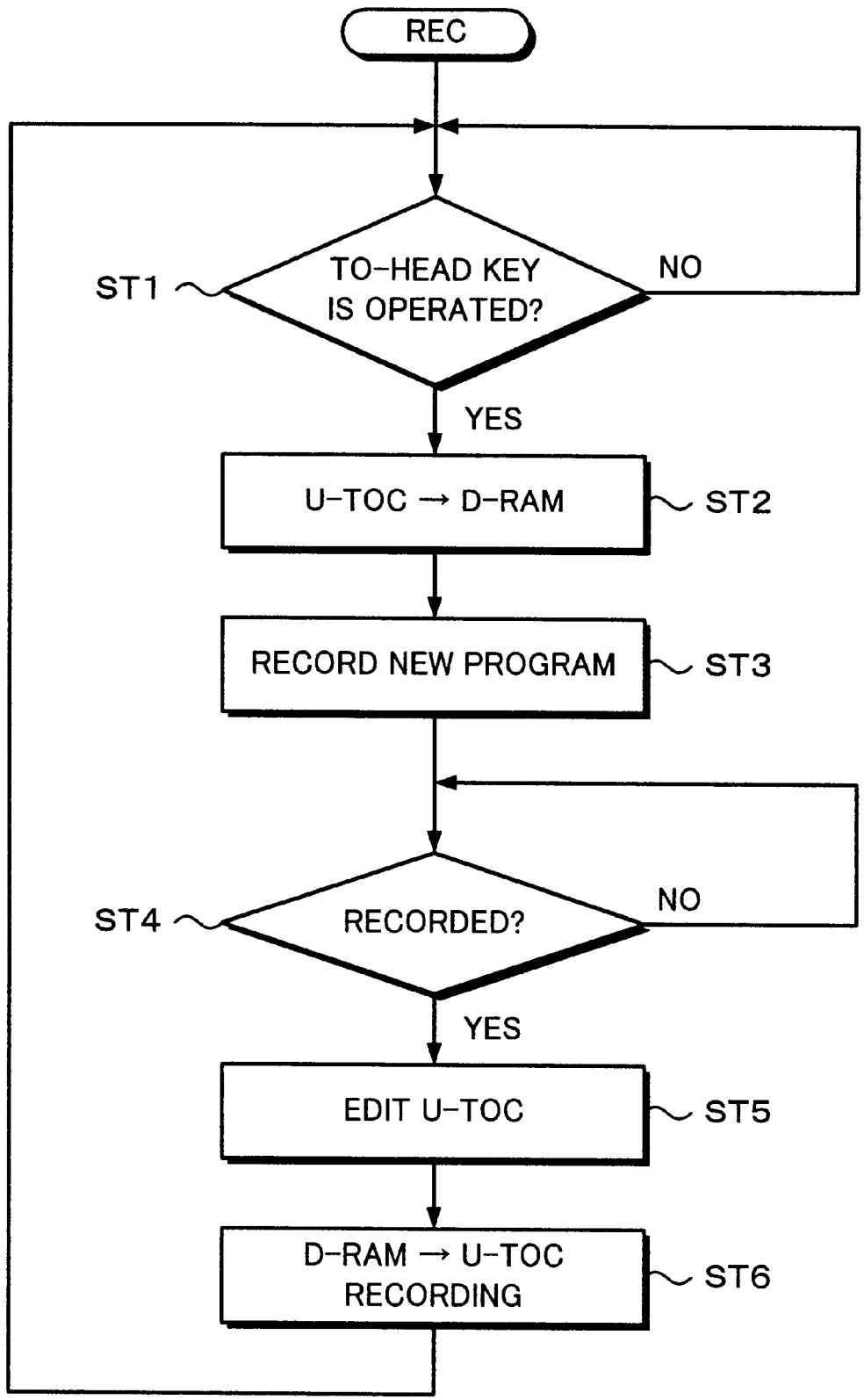
FIG. 10 is a flowchart for use in explanation of the operation in an example of a magnetooptic disc recording and reproducing apparatus to which the invention can be applied.

FIG. 10 is a flowchart showing processes in case of recording in a manner such that the music piece number of the newly recorded music piece is located to the head by using the "To Head" key 59 as mentioned above.

In FIG. 10, whether the "To Head" key 59 has been pressed or not is discriminated (step ST1). When the "To Head" key 59 is pressed, the data of the U-TOC is read out from the magnetooptic disc 1. The data of the U-TOC is stored into the RAM 13. The recording of the data (program) of the new music piece is started (step ST3). A check is made to see if the recording of the data of the new music piece has been finished (step ST4). When the recording of the data of the new music piece is finished, the U-TOC is edited (step ST5). That is, as shown in FIG. 9, the U-TOC is edited so that the music piece number of the new music piece is set to the head music piece number. After completion of the edition of the U-TOC, the edited U-TOC is recorded into the U-TOC region on the magnetooptic disc 1 from the RAM 13 (step ST6).

In the above example, when the new music piece is recorded, the music piece number of the newly recorded music piece is set to the head music piece number. However, it is also possible to change in a manner such that even after the recording of the music piece has already been finished, for example, by simultaneously pressing the recording key 58 and "To Head" key 59, the newly recorded music piece is set to the head music piece number. Such a control can be realized by processes such that the music piece which was recorded most recently is discriminated from the information of the sector 2 of the U-TOC and the music piece which was recorded newest is set to the first music piece number.

Figure 11:
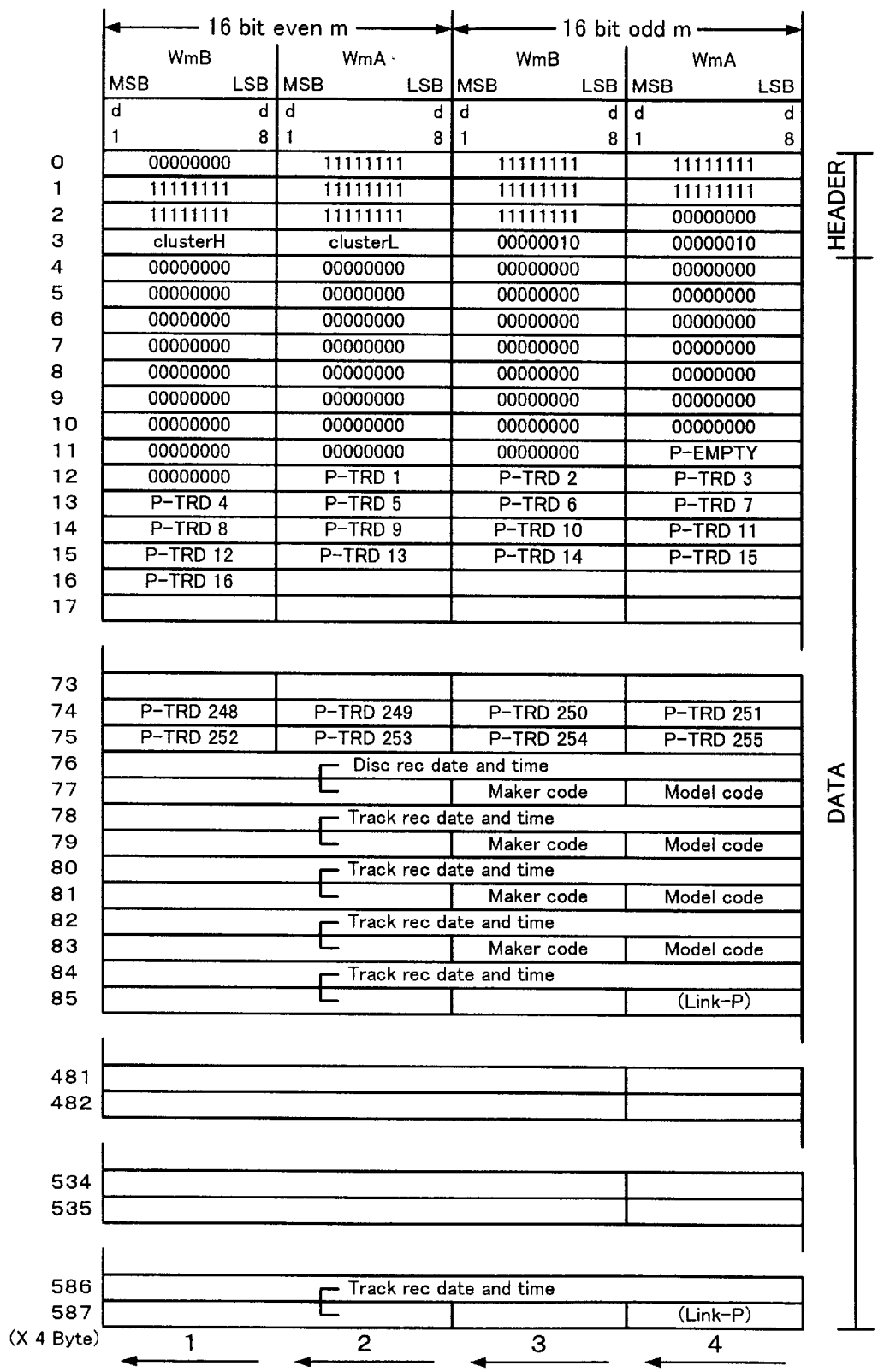
FIG. 11 is a data structural diagram for use in explanation of a managing area U-TOC sector-1 to manage date/time information.

That is, management information about the recording year, month, day, hour, minute, and second of each music piece is recorded in the sector 2 of the U-TOC. FIG. 11 shows a construction of the U-TOC sector 2.

As shown in FIG. 11, a header of a predetermined bit pattern is provided for the U-TOC sector 2. Subsequently, various table pointers regarding the time and date information are recorded.

The table pointer P-EMPTY is a pointer showing the position of the unused parts table. The link information Link-P is included in the slot indicated by the table pointer P-EMPTY. The head position of the next unused parts table is indicated by Link-P.

The table pointers P-TRD1 to P-TRD255 are pointers showing the positions of the parts table of the time information and date information of each track number. The year, month, day, hour, minute, and second when each music piece is recorded have been recorded in the parts tables of the positions indicated by the table pointers P-TRD1 to P-TRD255. The maker code and model code are stored in the parts table.

FIG. 12 shows processes in the case of setting the newly recorded music piece to the head music piece number after completion of the recording of the music piece.

In FIG. 12, a check is made to see if the "To Head" key 59 and recording key 58 have simultaneously been pressed (step ST11). When the "To Head" key 59 and recording key 58 are simultaneously pressed, the data of the U-TOC is read out and the data of the U-TOC is stored into the RAM 13 (step ST12). The latest music piece is searched from the information of the sector 2 of the U-TOC (step ST13). The sector 0 of the U-TOC and the sector 2 of the U-TOC are edited in a manner such that the latest music piece is set to the head music piece number (step ST14). That is, the U-TOC is edited in a manner such that the music piece number of the latest program is set to the head music piece number from the information of the sector 2 of the U-TOC. When the edition of the U-TOC is finished, the edited U-TOC is recorded from the RAM 13 into the U-TOC region of the magnetooptic disc 1 (step ST15).

In the above example, the audio signal is recorded onto the magnetooptic disc. The invention, however, can be also similarly applied to a case of recording programs to another recording medium such that a data region to record the programs and a managing region regarding the recorded programs are provided.

Further, according to the embodiment of the invention, although the shift of the latest music piece to the head after the end of the recording has been instructed by the operation to simultaneously press the "To Head" key and the recording key, this operation can be also designated by only the "To Head" key.

In the embodiment of the invention, although the shift of the latest music piece to the head before the start of the recording has been instructed by the operation of only the "To Head" key, this operation can be also designated by the operation to simultaneously press the "To Head" key and the recording key.

According to the invention, the "To Head" key is provided and by using the "To Head" key, the recording can be performed in a manner such that the music piece number of the program recorded just before becomes the head.

By using the "To Head" key and the recording key, after the end of the recording of the program, it is possible to change in a manner such that the program which is newly recorded is shifted to the head music piece number. Thus, for example, in case of making an original disc of the user in which the single music pieces of a certain artist are collected, the music piece number of the latest hit music piece which was newly recorded can be set to the head and the latest music piece can be immediately reproduced.

Particularly, when the user learns the words of the latest hit music piece in KARAOKE, the latest music piece can be recorded as a head music piece, so that it can be easily reproduced without performing any surplus key operation (AMS key operation).

For example, in the case where the user records his desired music piece onto the magnetooptic disc from music pieces which are broadcasted by the FM broadcasting or satellite broadcasting, the music piece number of the program which was recorded just prior thereto becomes the head and the program recorded just before can be easily immediately reproduced. Therefore, whether the program has certainly been recorded or not can be confirmed.

Further, in case of leaving the record of a conference or learning a language, by pressing the "To Head" key and recording, it is possible to easily access to the recorded position. The speech recorded just before or his own pronunciation can be soon confirmed.

Having described a specific preferred embodiment of the present invention with reference to the accompanying drawings, it is to be understood that the invention is not limited to that embodiment, and that various changes and modifications may be effected therein by one skilled in the art without departing from the scope or the spirit of the invention as defined in the appended claims.

What is claimed is:

1. A recording apparatus for recording programs onto a recording medium having a program area in which a plurality of programs are recorded and a managing area in which management data to manage the programs recorded in said program area has been recorded, comprising:

recording means for recording a new program onto the recording medium having already recorded thereon said plurality of programs;

editing means for editing the management data in said managing area so that said new program becomes a head program; and operating means for instructing so as to automatically start the editing of said management data when said new program is recorded.

2. The apparatus of claim 1 wherein said editing means configures said management data such that during reproduction of said recording medium, said new program is reproduced before said plurality of recorded programs.

3. The apparatus of claim 1 wherein said plurality of programs and said new program are one of audio data and video data.

4. A recording apparatus for recording programs onto a recording medium having a program area in which a plurality of programs are recorded and a managing area in which date/time information corresponding to the programs recorded in said program area and management data to manage a reproducing order of the programs recorded in said program area have been recorded, comprising:

detecting means for detecting a most recently recorded program on the basis of said date/time information in said managing area;

editing means for editing the management data to manage the reproducing order in said managing area so that the most recently recorded program detected by said detecting means becomes a head program; and operating means for instructing so as to automatically start the editing of said management data when said most recently recorded program is recorded.

5. An apparatus according to claim 4, further comprising operating means for instructing so as to start the edition of said management data after said new program was overwritten to the programs which have already been recorded.

6. The apparatus of claim 4 wherein said editing means configures management data to edit the reproducing order such that during reproduction of said recording medium, said most recently recorded program is reproduced before the reproduction of said plurality of recorded programs.

7. The apparatus of claim 4 wherein said plurality of programs and said most recently recorded program are one of audio data and video data.

8. A recording method of recording programs onto a recording medium having a program area in which a plurality of programs are recorded and a managing area in which management data to manage the programs recorded in said program area has been recorded, comprising the steps of:

recording a new program onto the recording medium already having recorded thereon said plurality of programs;

editing the management data in said managing area such that said new program becomes a head program; and instructing so as to automatically start the editing of said management data when said new program is recorded.

9. The method of claim 8 wherein said step of editing includes the step of editing said management data such that said new program is reproduced before said plurality of recorded programs.

10. The method of claim 8 wherein said plurality of recorded programs and said new program are one of audio data and video data.

11. A recording method of recording programs onto a recording medium having a program area in which a plurality of programs are recorded and a managing area in which date/time information corresponding to the programs recorded in said program area and management data to manage a reproducing order of the programs recorded in said program area have been recorded, comprising the steps of:

detecting a most recently recorded program on the basis of said date/time information in said managing area;

editing the management data to manage the reproducing order in said managing area such that said detected most recently recorded program becomes a head program; and instructing so as to automatically start the editing of said management data when said most recently recorded program is recorded.

12. The method of claim 11 wherein said step of editing includes the step of editing said management data to edit said reproducing order such that during reproduction of said recording medium, said most recently recorded program is reproduced before the reproduction of said plurality of recorded programs.

13. The method of claim 11 wherein said plurality of recorded programs and said new program are one of audio data and video data.

14. A recording and reproducing apparatus for recording programs onto and reproducing programs from a recording medium having a program area in which a plurality of programs are recorded and a managing area in which management data to manage the programs recorded in said program area has been recorded, comprising:

a recording unit for recording a new program onto the recording medium having already recorded thereon said plurality of programs;

an editing unit for editing the management data in said managing area so that said new program becomes a head program; and a controller for controlling said editing unit to automatically start the editing of said management data when said new program is recorded.

15. The apparatus of claim 14 wherein said editing unit configures said management data such that during reproduction of said recording medium, said new program is reproduced before said plurality of recorded programs.

16. The apparatus of claim 15 wherein said plurality of programs and said new program are one of audio data and video data.

17. The apparatus of claim 16 further including a display unit for displaying one or more of a recording time, a reproducing time, a program number, and a program name recorded on said recording medium.

18. The apparatus of claim 17 wherein said display unit includes a liquid crystal display.

19. The apparatus of claim 18 wherein said recording medium is a magnetooptical disc.

20. The apparatus of claim 14 wherein said plurality of programs and said new program are one of audio data and video data.

21. The apparatus of claim 20 further including a display unit for displaying one or more of a recording time, a reproducing time, a program number, and a program name recorded on said recording medium.

22. The apparatus of claim 21 wherein said display unit includes a liquid crystal display.

23. The apparatus of claim 22 wherein said recording medium is a magnetooptical disc.

24. The apparatus of claim 14 further including a display unit for displaying one or more of a recording time, a reproducing time, a program number, and a program name recorded on said recording medium.

25. The apparatus of claim 24 wherein said display unit includes a liquid crystal display.

26. The apparatus of claim 25 wherein said recording medium is a magnetooptical disc.

27. The apparatus of claim 14 wherein said recording medium is a magnetooptical disc.

\* \* \* \* \*